(12) United States Patent
Heffner et al.

(10) Patent No.: US 7,460,241 B2
(45) Date of Patent: Dec. 2, 2008

(54) FIBER OPTIC SENSOR COIL INCLUDING A RESTRAINING RING AND METHOD OF FORMING

(75) Inventors: Kenneth H. Heffner, Largo, FL (US); Jason C. Grooms, St. Petersburg, FL (US); David A. Barnes, Palm Harbor, FL (US); Neal B. Martinez, Maderia Beach, FL (US); Wayne E. Lance, Largo, FL (US)

(73) Assignee: Honeywell International, Inc., Morristown, NJ (US)

( * ) Notice: Subject to any disclaimer, the term of this patent is extended or adjusted under 35 U.S.C. 154(b) by 111 days.

(21) Appl. No.: 11/291,797

(22) Filed: Nov. 30, 2005

(65) Prior Publication Data

US 2007/0206196 A1 Sep. 6, 2007

(51) Int. Cl.
*G01C 19/72* (2006.01)
(52) U.S. Cl. ..................................................... 356/465
(58) Field of Classification Search ......... 356/460–465; 385/12, 13, 32
See application file for complete search history.

(56) References Cited

U.S. PATENT DOCUMENTS

| 4,702,599 | A | * | 10/1987 | Mohr | 356/465 |
|---|---|---|---|---|---|
| 5,245,687 | A | * | 9/1993 | Usui | 385/134 |
| 5,289,258 | A | * | 2/1994 | Szafraniec et al. | 356/460 |
| 5,917,983 | A | * | 6/1999 | Page et al. | 385/134 |
| 6,054,068 | A | * | 4/2000 | Carlson et al. | 264/1.24 |
| 6,788,834 | B2 | * | 9/2004 | Pokrovski et al. | 385/7 |
| 2001/0026666 | A1 | * | 10/2001 | Ferrera et al. | 385/123 |
| 2002/0141681 | A1 | * | 10/2002 | Goldner et al. | 385/12 |
| 2004/0247274 | A1 | * | 12/2004 | Gregory | 385/128 |
| 2005/0008279 | A1 | * | 1/2005 | Carlson et al. | 385/13 |
| 2005/0061076 | A1 | * | 3/2005 | Kim | 73/587 |

* cited by examiner

*Primary Examiner*—Tarifur R Chowdhury
*Assistant Examiner*—Jonathan M Hansen
(74) *Attorney, Agent, or Firm*—Black Lowe & Graham PLLC

(57) ABSTRACT

A fiber optic sensor coil and method of forming a fiber optic sensor coil including a plurality of turns of a first segment of optical fiber wound in a clockwise direction and a plurality of turns of a second segment of optical fiber wound in the counterclockwise direction. The turns of the first segment and of the second segment together forming a plurality of layers of turns of the optical fiber. A restraining ring covers an outermost layer of the plurality of layers of turns of optical fiber. The restraining ring includes a plurality of openings formed therein and provides a compressive force to the plurality of turns of the optical fiber.

20 Claims, 4 Drawing Sheets

FIBER OPTIC SENSOR COIL INCLUDING A RESTRAINING RING AND METHOD OF FORMING

STATEMENT REGAURDING FEDERALLY SPONSORED RESEARCH OR DEVELOPMENT

This invention was made with Government support under contract number 009 Z 9004 awarded by Boeing. The Government has certain rights in this invention.

FIELD OF THE INVENTION

The present invention relates to fiber optic gyroscopes. More particularly, the present invention relates to an improved fiber optic sensor coil for use in fiber optic gyroscopes.

BACKGROUND OF THE INVENTION

A fiber optic gyroscope is a navigation sensor that is based on comparative phase measurements of electromagnetic radiation traveling over a known distance of optical waveguide materials. Fiber optic gyroscopes use a wound, circular, optical fiber bundle to guide and transmit light waves, that are the physical basis for measuring co-planar, co-axial rotational movement. More specifically, the optical fibers provide a time-dependent, optical output signal to indirectly determine the amount of rotation by an object (e.g. an aircraft) about an axis of rotation in a plane. One particular type of fiber optic gyroscope is a Sagnac interferometer, which includes a light source that provides an optical signal, a multi-turn coil of optical fibers (hereafter referred to as a fiber optic sensor coil), detectors, and electronic read-out and control circuits.

The fiber optic gyroscope includes at least one fiber optic sensor coil that is formed by tightly winding the optical fibers into a cylindrical structure. In most instances, a typical fiber optic gyroscope is comprised of three fiber optic sensor coils positioned in a three-axis, independent orthogonal configuration to sense rotation about each of three respective orthogonal axes. The gyro's optical fiber is typically comprised of an inner glass core, an outer glass cladding layer and a thin, polymeric coating (e.g. acrylic-based) placed over the glass core. The inner glass and the outer glass are fabricated to have different optical indices of refraction. The optical fiber is typically bound to itself through the use of an adhesive coating that is applied to the full length of the fiber surface as the fiber is wound into a coil. These fiber optic sensor coils are formed of thousands of meters of optical glass fiber that is used to transmit optical signals over long distances with low loss and distortion.

During fabrication of the fiber optic sensor coils, the optical fibers are tightly wound into a cylindrical structure, such that the optical fiber is bound to itself through the use of an adhesive coating. Any unplanned gaps or separations that are formed between the optical fibers during the winding process, impart unacceptable sensor sensitivity to small changes in ambient pressure. In addition, during fabrication a fully insulating overcoat is formed on the external surface of the optical sensor coil. This overcoat, typically formed of a polymer, acts as a plastic barrier restraining the free flow of gasses entrapped in the sensor coil from escaping, thus contributing to gap formation. The sensitivity to changes in ambient pressure is due to high frequency vibrations of loose sub-surface fiber strands in the gaps or separations formed during the winding and overcoat processes for the optical fiber used to form the sensor coil. Free-standing fiber strands in the fiber optic sensor coil can also be the result of thermal or mechanical shock induced by the surrounding environment Such vibration induces a random phase change in the traversing light signal. This phase change is noise in the true, baseline signal and the affected navigation sensor produces erroneous data.

Thus, there is a need for a fiber optic sensor coil and method of fabricating a fiber optic sensor coil for use in a fiber optic gyroscope whereby the sensor coil is not susceptible to small changes in ambient pressure and thereby able to produce more accurate coil rotation information.

SUMMARY OF THE INVENTION

The present invention provides a fiber optic sensor coil comprising a plurality of layers of turns of an optical fiber, and a restraining ring covering an outermost layer of the plurality of layers of turns of the optical fiber. The restraining ring includes a plurality of openings formed therein. The restraining ring provides a compressive force to the plurality of turns of the optical fiber.

In another exemplary embodiment, a fiber optic sensor coil comprises a plurality of turns of a first segment of optical fiber wound in a clockwise direction and a plurality of turns of a second segment of optical fiber wound in the counterclockwise direction. The turns of the first segment and of the second segment together forming a plurality of layers of turns of optical fiber. A restraining ring covers an outermost layer of the plurality of layers of turns of optical fiber. The restraining ring includes a plurality of openings formed therein and providing a compressive force to the plurality of turns of the optical fiber.

In addition, provided is a method of forming a fiber optic sensor coil comprising a plurality of layers by winding an optical fiber on a spool. The method comprising the steps of forming a plurality of layers of optical fiber on the spool. The method includes the steps of winding a first segment of the optical fiber in a clockwise direction on the spool, and winding a second segment of the optical fiber in a counterclockwise direction on the spool to form the plurality of layers. Next, a restraining ring is applied to an outermost layer of the plurality of layers of the optical fiber. The restraining ring includes a plurality of openings formed therein and provides a compressive force to the plurality of turns of the optical fiber.

Other independent features and advantages of the preferred fiber optic sensor coil with restraining ring will become apparent from the following detailed description, taken in conjunction with the accompanying drawings which illustrate, by way of example, the principles of the invention.

DETAILED DESCRIPTION OF A PREFERRED EMBODIMENT

The present invention employs a restraining ring or sleeve for compressing the fiber optic strands that make up the fiber optic sensor coil in a fiber optic gyroscope such that negative effects of environmental influences on the fiber optic gyroscope may be minimized. Before proceeding with the detailed description, it is to be appreciated that the described embodiment is not limited to use in conjunction with a specific fiber optic gyroscope design. Thus, although the description is explicitly directed toward an embodiment that includes a plurality of fiber optic sensor coils, it should be appreciated that it can be implemented in other fiber optic gyroscope designs, including those described above and those known now or hereafter in the art.

Figure 1:
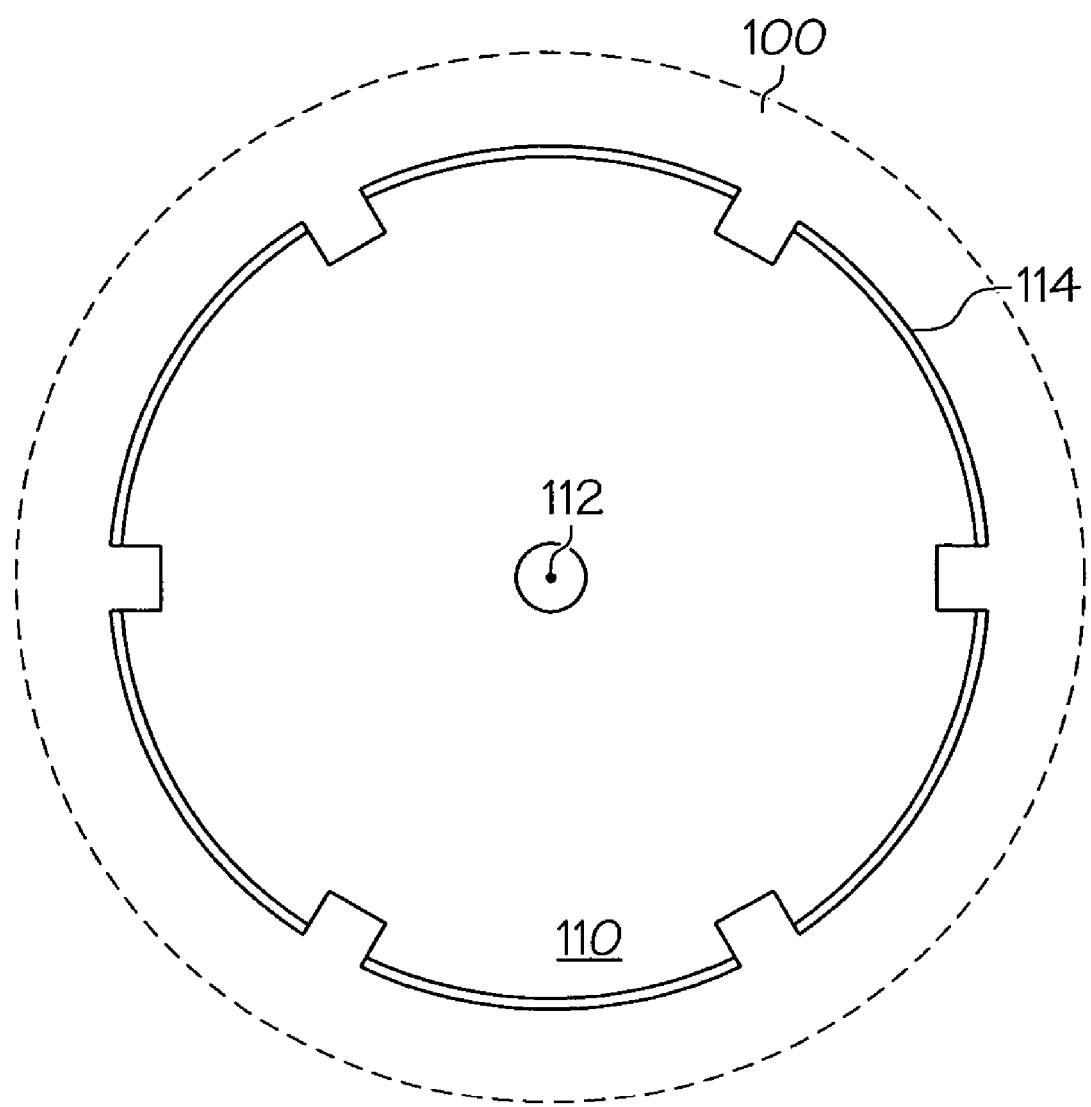
FIG. 1 is a schematic representation of a cross-section of a sensor coil adhered to a spool.

FIG. 1 depicts in a simplified end view, a coil and spool fiber optic sensor system in which a substantially cylindrical fiber optic sensor coil 100 circumscribes a substantially cylindrical support structure, e.g., a spool, a hub, 110. The sensor coil 100 is constructed as an optical fiber sensor coil for use, for example, in a fiber optic gyroscope. Both sensor coil 100 and spool 110 are oriented about a center axis 112. A relatively small gap with respect to the radii of sensor coil 100 and spool 110 exists between sensor coil 100 and spool 110 into which an adhesive 114 is applied to affix sensor coil 100 to spool 110.

Sensor coil 100 is typically composed of optical fibers which are made from a glass medium. Each fiber has an inner glass core and an outer glass shell, where the inner glass and the outer glass have different optical indices of refraction. A polymeric coating, or jacket, is placed over the outer glass to protect the surface thereof from defects. The optical fibers are then wound onto spool 110, adhered and cured to make sensor coil 100 self-supporting when separated from the spool 110. When separated from the spool 110, self-supporting sensor coil 100 is substantially cylindrical, having a relatively thick cylindrical wall of fiber.

The spool 110 nominally sets the dimensions of sensor coil 100, such as the inside diameter, the height, and the outside diameter depending upon how many layers or turns of fiber are used. Typically, once sensor coil 100 is removed from the spool 110 it is temperature cycled for stability. Because of the temperature exposure and the relaxation of stresses that are introduced during the winding of the fibers, the dimensions of sensor coil 100 change slightly from those initially established from the spool 110. For example, the diameter of sensor coil 100 might change by 0.1 to 0.2 percent after sensor coil 100 is removed from the spool 110.

Sensor coil 100 is sensitive to temperature variations and exhibits thermal expansion and contraction in response to such fluctuations. When exposed to temperature variations, sensor coil 100 may expand non-uniformly in its axial direction with respect to center axis 112 and its radial direction. The rate at which sensor coil 100 expands depends in part upon its material composition.

Figure 2:
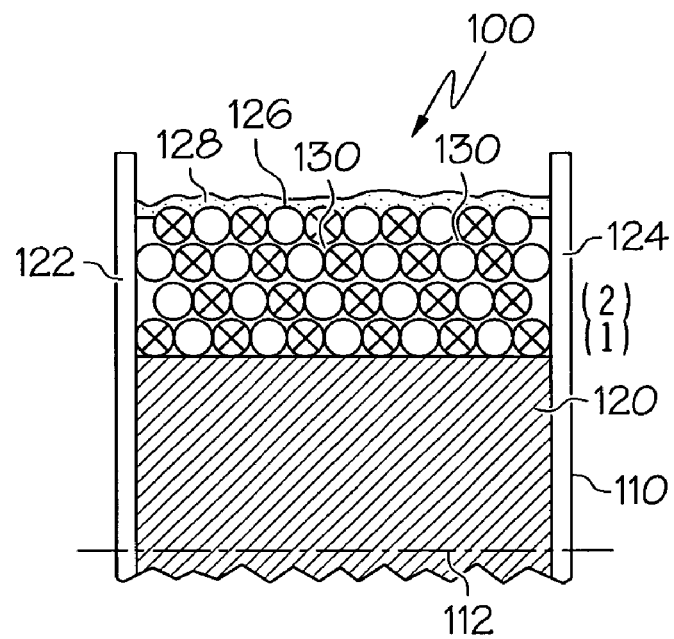
FIGS. 2 and 3 are schematic representations of a cross-section of a portion of a conventional sensor coil.
Figure 3:
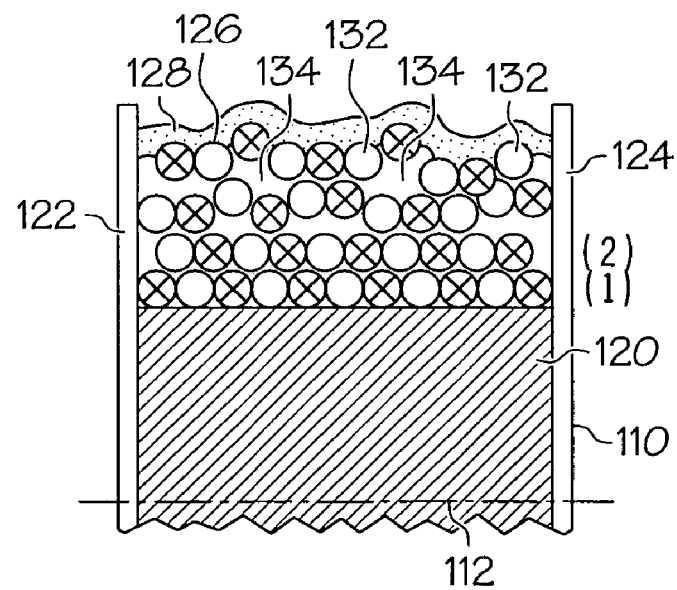

Referring now to FIGS. 2 and 3, depicted is a schematic representation of a partial cross section of conventional sensor coil 100 wound on spool 110 having a core 120 and opposing flanges 122 and 124. The sensor coil 100 consists of a continuous optical fiber of a selected length having its midpoint adjacent the core of the spool and its ends exposed. The two optical fiber segments extending from the midpoint, referred to as the forward segment and the reverse segment, are wound on the spool 110 in opposite directions. In use, as explained in the background of the invention, two identical optical signals are individually applied to opposite ends of the sensor coil 100 and propagate through the forward and reverse segments in opposite directions.

More particularly, illustrated is sensor coil 100 having a plurality of layers of optical fiber 126, each layer consisting of a number of turns of oppositely wound fiber segments. For the sake of this description, turns of the forward fiber segment are depicted as extending away from the viewer and identified by X's, and turns of the reverse segment are depicted as extending toward the viewer and are referred to as O's. The sensor coil 100 shown in FIG. 2 has a first layer (1) having an odd number of turns, e.g., 99 turns. The second layer (2) has an even number of alternate, oppositely directed turns of the optical fiber. The outermost turns of that layer are preferably displaced from each of the flanges 122, 124 by a distance of approximately one-half of the diameter of the fiber, such that the second layer (2) has one fewer turn than the first layer. This arrangement of layers is repeated such that all even numbered layers have one fewer turn than the odd numbered layers. This allows the fiber turns of each successive layer to be positioned in the naturally formed grooves or "valleys" between adjacent turns of the previous layer. This arrangement of layers lends stability to the sensor coil. It also tends to reduce the overall sensor coil diameter, which can be significant in spacecraft and other applications that may have substantial space limitations.

After sufficient optical fiber layers 126 have been completed, a coating layer 128 is applied over the outermost optical fiber layer 126. Coating layer 128 creates pockets of trapped air 130. In this preferred embodiment, coating layer 128 is formed of a polymeric material (e.g. polyurethane-based resin) and provides for cohesive integrity of the outer fiber windings. After the coating layer 128 applied, it undergoes a curing process, such as a vacuum bake process. During this curing process, random sections 132 of optical fiber 126 may become debonded and separate from the sensor coil 100 as illustrated in FIG. 3 form gaps or pockets 134. In addition, coating layer 128 acts as a plastic barrier restraining the free flow of gasses that may be entrapped in the sensor coil 100, further contributing to the formation of gaps 134. This debonded optical fiber 126 creates areas in sensor coil 100 that are sensitive to environmental pressure and generate varying axial strain in the fibers, resulting in gyroscope errors. The sensitivity to ambient pressure derives from high frequency vibrations of loose sub-surface fiber strands in the gaps 134 of sensor coil 100.

Figure 4:
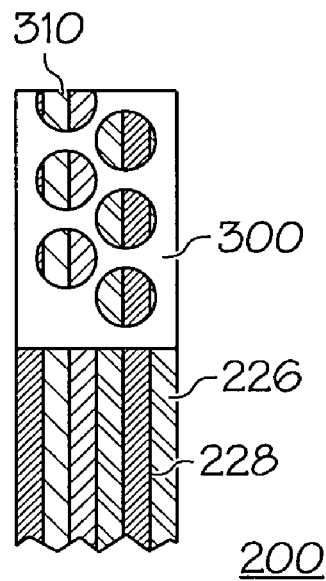
FIGS. 4 and 5 are schematic representations of a cross-section of a portion of a sensor coil in accordance with the invention.
Figure 5:
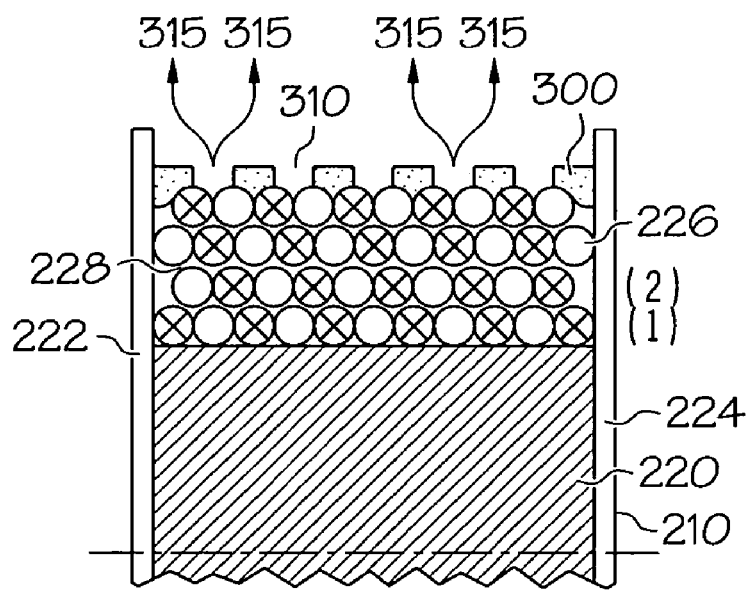

Turning now to FIGS. 4 and 5, depicted are schematic representations of partial cross sections of a sensor coil according to the present invention. Sensor coil 200 is formed in generally the same manner as sensor coil 100 of FIGS. 1-3. More specifically, sensor coil 200 is wound on a spool 210 having a core 220 and opposing flanges 222 and 224. The sensor coil 200 consists of a continuous optical fiber of a selected length having its midpoint adjacent the core of the spool and its ends exposed.

More particularly, illustrated is sensor coil 200 having a plurality of layers of optical fiber 226, each layer consisting of a number of turns of oppositely wound fiber segments. For the sake of this description, similar to optical fiber 126 of FIGS. 2 and 3, turns of a forward fiber segment are depicted as extending away from the viewer and identified by X's, and turns of a reverse segment are depicted as extending toward the viewer and are referred to as O's. Similarly, sensor coil 200 shown in FIG. 5 has a first layer (1) having an odd number of turns, and a second layer (2) having an even number of alternate, oppositely directed turns of the optical fiber. In this preferred embodiment a midpoint of the length of the optical fiber is placed near one side flange, either 222 or 224, and a first optical fiber segment and a second optical fiber segment emanating from the midpoint, are then wound around the spool 210 in opposite directions to form a dipole sensor coil in which the forward and reverse segments form alternating layers. It should be understood that this particular type of sensor coil is merely exemplary and that other types of sensor coils may also be used. For example, a quadrupole sensor coil in which a layer of the forward segment is followed by two layers of the reverse segment, and so on, an octopole sensor coil in which two layers of the forward segment are followed by two layers of the reverse segment, and so on, and a sensor coil wherein a midpoint of the optical fiber is positioned to form the midpoint of a first alternating layer could also be used.

In a preferred embodiment, optical fiber 226 is coated with an adhesive material 228, such as a polymeric material (e.g. a modified, acrylate-based network polymer), prior to winding. Adhesive material 228 provides adherence of the optical fiber 226 to itself and aids in preventing separation of the plurality of layers of optical fiber 226 that are formed during the winding process.

After sufficient turns of optical fiber 226 have been completed, a restraining ring 300 is applied over an outermost layer of the plurality of layers of optical fiber 226. Restraining ring 300 in this particular embodiment is formed of a polymeric elastomer (e.g. polyurethane elastomer), and is applied so as to exert a compressive force onto the optical fiber 226. Restraining ring 300 as illustrated includes a plurality of spaced openings 310, and is formed to have a preferred ratio of restraining material to openings 310. In this particular embodiment, openings 310 are formed such that the ratio of restraining material to openings is approximately 1:1. Restraining ring 300 provides at least two functions in eliminating the problems presented by loose fibers in unwanted gaps or separations of sensor coil 200. First, restraining ring 300 applies a compressive force to the complete outer layer of sensor coil 200 that is sufficient to restrain the separation of the plurality of windings of optical fiber 226 from each other. Although the magnitude of the compressive force may vary, it is typically 1 pound per square inch (psi). In addition, the restraining ring 300 permits outgassing 315 from the sensor coil 200. Restraining ring 300 as previously stated preferable includes a plurality of spaced openings 310. These spaced openings 310 allows gasses, as indicated by reference numeral 312 in FIG. 5, that are formed during the fabrication of sensor coil 200 to pass there through. Therefore, the benefit of the restraining ring is two-fold: i) the requirement for the polymeric overcoat (128) and the associated, deleterious cure is no longer needed to hold the outer coil layers in place (such structural support is provided by the restraining ring); and, ii) the free flow of gasses from the optical fiber bundle is enabled by the openings in the restraining ring. Thereby, formation of gaps or pockets of air as described with regard to FIG. 3 is eliminated In one particular embodiment, restraining ring 300 is fabricated as a heat-shrinkable material that is applied directly to the outermost surface of optical fiber 226 as a pre-formed, fitted, sleeve. Upon curing, as the heat-shrinkable material is heated, it will shrink and thereby apply a compressive force to the surface of sensor coil 200 while at the same time forming an adhesive bond to sensor coil 200. In an alternative embodiment, restraining ring 300 is applied directly to optical fiber 226 as a fitted, mechanical ring, wherein the compressive force applied by the ring 300 can be pre-set at an optimized value for the application. In yet another embodiment, restraining ring 300 is applied directly to optical fiber 226 as an elastomeric, fitted, pre-formed ring that, through the selection of material properties, applies a compressive force to the surface of the sensor coil 200 while forming an adhesive bond to the surface.

Figure 6:
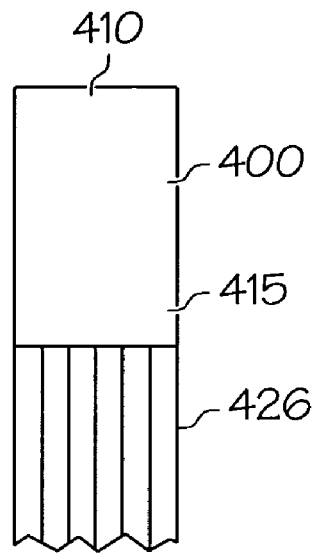
FIGS. 6 and 7 are schematic representations of a cross-section of a portion of a sensor coil in accordance with an alternate embodiment of the invention.
Figure 7:
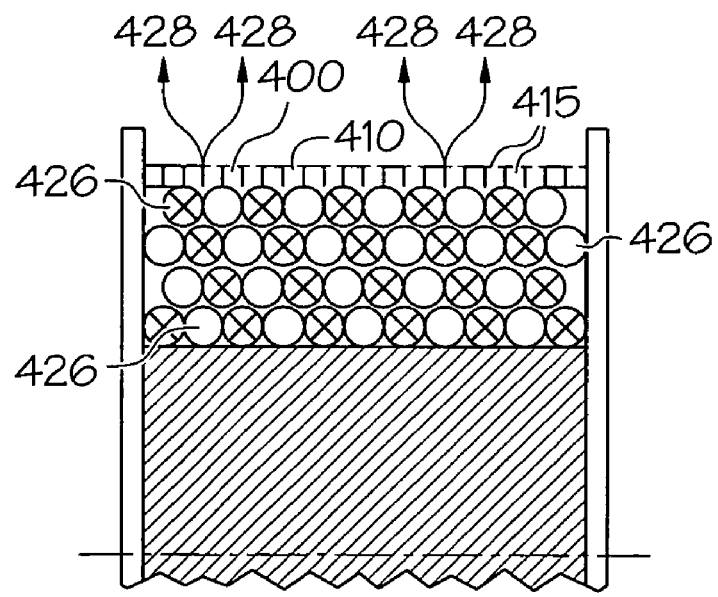

Referring now to FIGS. 6 and 7, illustrated in simplified cross-sectional views is an alternative embodiment of a restraining ring 400. Restraining ring 400 is depicted as formed of a meshed, breathable material having a plurality of openings 410 formed between a plurality of orthogonally woven material fibers 415 that form the meshed material. Similar to restraining ring 300, restraining ring 400 exerts a compressive force on an outermost layer of the plurality of windings of an optical fiber 426. In addition, restraining ring 400 provides outgassing 428 of the sensor coil during any subsequent curing or baking processes. Restraining ring 400 is applied directly to the outmost surface of optical fiber 426 as a pre-formed, fitted sleeve, as a fitted mechanical ring, or as an elastomeric, fitted, pre-formed ring as previously described with regard to restraining ring 300.

A restraining device for optical fiber sensor components has now been provided that includes a restraining ring that is applied to the surface of an optical fiber that has been wound about a spool to form a sensor coil. The restraining ring includes a plurality of openings formed therein the restraining ring. The restraining ring provides a compressive force exerted upon the sensor coil, thereby eliminating any separation of the layers of optical fiber and the formation of gaps. The openings in the restraining ring provide for outgassing during subsequent processing steps. The restraining ring prevents any unplanned gaps or separations in the plurality of layers of optical fiber formed by the turns, thereby eliminating the influence of environmental factors, such as ambient pressure changes, upon the sensor coil and the formation of erroneous sensor data.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A fiber optic sensor coil comprising:
   a plurality of layers of turns of an optical fiber wound about an axis; and
   a restraining ring covering an outermost layer of the plurality of layers of turns of the optical fiber, the restraining ring including a plurality of openings formed therein and providing a compressive force to the plurality of turns of the optical fiber, the plurality of openings being disposed along a plane substantially parallel to the axis and providing a fluid egress from the plurality of layers to the ambient encompassing the coil.

2. The fiber optic sensor coil of claim 1, further including an adhesive material to adhere the plurality of layers of turns of an optical fiber to one another.

3. The fiber optic sensor coil of claim 1, wherein the restraining ring is formed of meshed material.

4. The fiber optic sensor coil of claim 1, wherein the restraining ring is formed of a polymeric, elastomeric material having a plurality of openings formed there through.

5. The fiber optic sensor coil of claim 1, wherein the restraining ring is formed of an elastomeric material.

6. The fiber optic sensor coil of claim 1, wherein the restraining ring is formed of a heat-shrinkable material.

7. The fiber optic sensor coil of claim 1, wherein the restraining ring is formed of a mechanical ring.

8. A fiber optic sensor coil comprising:
- a plurality of turns of a first segment of optical fiber wound about an axis in a clockwise direction and a plurality of turns of a second segment of optical fiber wound about the axis in the counterclockwise direction;
- the turns of the first segment and of the second segment together forming a plurality of layers of turns of optical fiber; and
- a restraining ring covering an outermost layer of the plurality of layers of turns of optical fiber, the restraining ring including a plurality of openings formed therein and providing a compressive force to the plurality of turns of the optical fiber, the plurality of openings being disposed along a plane substantially parallel to the axis and providing a fluid egress from the plurality of layers to the ambient encompassing the coil.

9. The fiber optic sensor coil of claim 8, wherein the restraining ring is formed of a polymeric, elastomeric material having a plurality of openings formed there through.

10. The fiber optic sensor coil of claim 8, wherein the restraining ring is formed of meshed material.

11. The fiber optic sensor coil of claim 8, wherein the restraining ring is formed of an elastomeric material.

12. The fiber optic sensor coil of claim 8, wherein the restraining ring is formed of a heat-shrinkable tubing.

13. The fiber optic sensor coil of claim 8, wherein the restraining ring is formed of a mechanical ring.

14. The fiber optic sensor coil of claim 8, wherein the sensor coil is formed as one of a dipole sensor coil, a quadruple sensor coil, an octopole sensor coil, or a sensor coil wherein a midpoint of the optical fiber is positioned to form a midpoint of a first alternating layer.

15. A method of forming a fiber optic sensor coil comprising the steps of:
- forming a plurality of layers by winding about an axis a first segment of an optical fiber in a clockwise direction on a spool and a second segment of the optical fiber in a counterclockwise direction on the spool; and
- applying a restraining ring to an outermost layer of the plurality of layers of the optical fiber, the restraining ring including a plurality of openings formed therein and providing a compressive force to the plurality of turns of the optical fiber, the plurality of openings being disposed along a plane substantially parallel to the axis and providing a fluid egress from the plurality of layers to the ambient encompassing the coil.

16. The method of claim 15, wherein the step of applying a restraining ring comprises applying an elastomeric material having a plurality of openings formed therein to cover the outermost layer of the plurality of layers of the optical fiber.

17. The method of claim 15, wherein the step of applying a restraining ring comprises applying a meshed material formed having a
- plurality of openings formed therein by a plurality of fibers that comprise the meshed material, the meshed material covering the outermost layer of the plurality of layers of the optical fiber.

18. The method of claim 15, wherein the step of applying a restraining ring comprises applying a heat-shrinkable material having a plurality of openings formed therein to cover the outermost layer of the plurality of layers of the optical fiber.

19. The method of claim 18, further including the step of heating the heat-shrinkable material.

20. The method of claim 15, wherein the step of applying a restraining ring comprises applying a mechanical compression ring having a plurality of openings formed therein to cover the outermost layer of the plurality of layers of the optical fiber.

* * * * *